(12) United States Patent
Rouyer et al.

(10) Patent No.: US 8,363,322 B2
(45) Date of Patent: Jan. 29, 2013

(54) METHOD OF ADJUSTING THE COMPENSATION FOR PUPIL DELAY IN A CONVERGENT OR DIVERGENT BEAM

(75) Inventors: Claude Rouyer, Cestas (FR); Jérôme Neauport, Bordeaux (FR); Nathalie Blanchot, Pessac (FR); Jacques Sauteret, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 508 days.

(21) Appl. No.: 12/443,651

(22) PCT Filed: Oct. 3, 2007

(86) PCT No.: PCT/EP2007/069516
§ 371 (c)(1),
(2), (4) Date: Jan. 21, 2010

(87) PCT Pub. No.: WO2008/040767
PCT Pub. Date: Apr. 10, 2008

(65) Prior Publication Data
US 2010/0177389 A1      Jul. 15, 2010

(30) Foreign Application Priority Data
Oct. 5, 2006   (FR) ...................... 06 54106

(51) Int. Cl.
*G02B 5/18*      (2006.01)
*G02B 13/00*     (2006.01)

(52) U.S. Cl. .......... 359/566; 359/356; 359/744

(58) Field of Classification Search .......... 359/565, 359/353, 354, 744, 566; 372/700
See application file for complete search history.

(56) References Cited

U.S. PATENT DOCUMENTS
5,099,358 A * 3/1992 Okazaki ............. 359/503
(Continued)

FOREIGN PATENT DOCUMENTS
FR      2 723 216 A1    7/1987
JP      2004 205652 A   7/2004

OTHER PUBLICATIONS

French Patent Office International Search Report, Dated Jan. 16, 2007—3 pages. Z. Bor—"Distortion of Femtosecond Laser Pulses in Lenses"—1990 Optical Society of America—Jan. 15, 1989 / vol. 14. No. 2 / Optics Letters—pp. 119-121.

(Continued)

*Primary Examiner* — Audrey Y Chang
(74) *Attorney, Agent, or Firm* — Brinks Hofer Gilson & Lione

(57) ABSTRACT

A method of adjusting the pupil delay compensation of a convergent or divergent beam that includes placing a device composed of an afocal system comprising one or more passive optical components disposed on the propagation axis of the beam, at least one of the components being a focusing diffractive component, and moving the device along the propagation axis of the beam until the required pupil delay compensation is obtained, where the compensation is the algebraic sum of pupil delays of each passive optical component of the afocal system and lying in a range of values the limits of which are functions of the particular combination of the optical components chosen to form the afocal system of the compensation device.

7 Claims, 2 Drawing Sheets

U.S. PATENT DOCUMENTS

| | | | | |
|---|---|---|---|---|
| 5,229,880 | A | * | 7/1993 | Spencer et al. ............... 359/353 |
| 5,264,912 | A | | 11/1993 | Vaught et al. |
| 5,415,727 | A | | 5/1995 | Gal et al. |
| 5,493,441 | A | * | 2/1996 | Chipper ......................... 359/354 |
| 5,537,245 | A | * | 7/1996 | Migozzi ......................... 359/356 |
| 5,548,439 | A | * | 8/1996 | Smith ........................... 359/353 |
| 6,049,434 | A | | 4/2000 | Norrie |
| 7,911,668 | B2 | * | 3/2011 | Maeda ....................... 359/206.1 |
| 2005/0018293 | A1 | | 1/2005 | Suzuki |

OTHER PUBLICATIONS

Database Inspec (Online)—The Institution of Electrical Engineers, Stevenage, GB; Publication Date: Oct. 1, 1997—Gonzalez Inchauspe C M et al.—"Aberration Compensation of a Curved Diffraction Grating Stretcher for Femtosecond Chirped-Pulse Amplification"—pp. 2696-2700.

* cited by examiner

METHOD OF ADJUSTING THE COMPENSATION FOR PUPIL DELAY IN A CONVERGENT OR DIVERGENT BEAM

PRIORITY CLAIM

This application is a U.S. nationalization of PCT Application No. PCT/EP2007/060516, filed Oct. 3, 2007, and claims priority to French Patent Application No. 0654106, filed Oct. 5, 2006, the entire contents of which are hereby incorporated herein by reference.

TECHNICAL FIELD

The invention relates to a method for adjusting the compensation for the pupil delay taking place during the propagation of brief light pulses, in particular in laser apparatus.

BACKGROUND

The amplification of a brief pulse in a laser chain causes various distortions in the wave packet. The concern here is with the particular distortions associated with the use of lenses for propagating the laser beam. Lenses are optical components normally used in a laser chain, for example for increasing the size of the beam, for filtering the undesirable spatial frequencies and for transporting the image of a plane. In the majority of cases, focal systems consisting of two lenses are used.

An additional difficulty arises when the diameter of the laser beam becomes great. In this case, the differences in thickness of glass found from the centre to the edge of a lens creates a particular distortion relating to a propagation delay term between the central ray and the rays at the periphery of the beam. The main effect of this distortion is to delay the light energy of the centre of the wave packet compared with the energy at the periphery.

In high-energy so-called femtosecond chains, this delay is often of the same order of magnitude as the duration of the pulse. A femtosecond chain delivers light pulses of a few tens of femtoseconds (1 fs=$10^{-15}$s) and an energy from a few joules for lasers of 100 terawatts) to a few tens of joules (for petawatt lasers). The problem with femtosecond chains is that, because of the delay, the physical target that in the end receives the energy of the wave packet focused at the end of the chain is illuminated for a time greater than the duration of the pulse. Consequently the instantaneous heating of the target is rapidly less effective and the peak intensity of the confinement, expressed in watts per $cm^2$, is no longer optimized. It is therefore important to be able to correct the delay appearing in these laser chains in order to obtain brief-energy pulses with the minimum of defects.

It was in 1988 that the spatio-temporal effects created by the use of lenses was calculated for the first time by Bor (Z. Bor, Distortion of femtosecond laser pulses in lenses, Optics Letters, vol. 14, N° 2, 1989, pp 119-121). These effects are broken down into a group speed dispersion term and a propagation delay term (pupil delay). The distortions caused on the light pulse by the pupil delay are preponderant not only in laser chains but also in microscopy systems in which large-aperture lenses are necessary and in ultra-brief laser characterization instrumentation (such as autocorrelators and spiders using lenses). Bor demonstrated that the effect of pupil delay on the temporal broadening of the pulse could be 2 to 3 times greater than the temporal broadening caused by the dispersion of group speeds.

A light pulse can be described as being a wave packet consisting of a carrier 1, which oscillates at the frequency of the wave, multiplied by an envelope function 2. A light pulse is illustrated in FIG. 1.

The carrier and envelope do not propagate at the same speed in an optical medium. This is because the carrier moves at the phase speed $v_\phi$ of the wave and the envelope moves at the group speed $v_g$. There are thus, in a dispersive medium of index n, the following equations:

$$v_\phi = \lambda.v = c/n_0 \text{ and}$$

$$v_g = v_\phi - \lambda.(dv_\phi/d\lambda)_\lambda$$

where $\lambda$ is the mean wave length in the medium, $v$ the frequency of the wave, c the speed of light in a vacuum and $n_0$ the index at the mean wavelength $\lambda_0$ in a vacuum ($\lambda = \lambda_0/n_0$).

It should be noted that $1/v_g$ can be written as a function of the parameters of the medium and of the mean wave length $\lambda_0$:

$$1/v_g = n_0/c - n_\lambda.\lambda_0/c$$

where $n_\lambda = (dn/d\lambda)\lambda_0$

The beam propagating the incident pulse is represented in FIG. 2 by five light rays. The light beam here passes through a convergent lens and the five incident rays converge at the focus F of the lens.

As the lens is convergent, the two peripheral rays pass through a small thickness of glass and reach the focus F first. The central ray, which passes through the greatest thickness of glass, arrives at the focus F with a delay $\delta$. The two middle rays arrive at the focus with an intermediate delay.

We observe that the phase front is represented upstream of the lens by the plane P and downstream by the arc of a circle C, the centre of which is situated at the focus F. The phase of the wave is therefore conveyed as far as the focus F of the lens without deformation whereas the energy transported by the pulse, represented by the arc of a circle E, has a substantial distortion with respect to the phase front.

We will note here that, for a divergent lens, the delay $\delta$ would be reversed and the central ray would here this time be in advance with respect to the other rays.

The pupil delay $\delta$ is calculated from the following formula:

$$\delta = \beta.T.(h^2/2f)$$

It will be explained how this formula is obtained.

For this purpose and in order to avoid complicated calculations, FIG. 3 presents a thin plano-convex lens, the orientation of which with respect to the beam is chosen solely in order to clarify the presentation. In this FIG. R is the radius of curvature of the convex face of the lens and $n_0$ represents the index of the medium at the mean light wave length.

According to Fermat's principle, the optical path actually followed by the light between two points is stationary. This means that all the optical paths of the rays starting from the equi-phase plane P and going to the focus F are identical. We therefore necessarily have:

$$HF = OS + SF$$
$$= n_0 \cdot x + SF$$
$$= n_0 \cdot x + f$$

where f represents the focal distance of the lens.

For this thin lens, we have the following equations:

$$R = (n_0 - 1)\cdot f \text{ and}$$

$$x = h^2/2R$$

The pupil delay between the peripheral rays and the central ray is therefore as follows:

$$\delta = (HF - f)/c - (x/v_g)$$
$$= (n_0 \cdot x/c) - x \cdot (n_0/c - n_\lambda \cdot \lambda_0/c)$$
$$= (n_\lambda/(n_0 - 1)) \cdot \lambda_0 \cdot h^2/2c \cdot f$$

By putting $\beta = n_\lambda/(n_0-1)$ (dispersive term) and $T = \lambda_0/c$ (the period of the wave), the expression of $\delta$ is then:

$$\delta = \beta \cdot T \cdot (h^2/2f)$$

It can be noted that the pupil delay $\delta$ has an axial symmetry. This is because all the peripheral rays propagating on an aperture of radius h have the same delay $\delta$ with respect to the central radius.

In a convergent lens, the pupil delay $\delta$ is negative because of the dispersion term $\beta$. The delay $\delta$ in a convergent lens is then a temporal advance.

Conversely, the pupil delay $\delta$ will be positive in a divergent lens and the peripheral rays will have a real delay with respect to the central ray.

We will note that the total temporal delay $\delta_T$ of a chain is the sum of all the algebraic delays of the lenses present. Thus, for example, for an afocal system of axial magnification of $-1$ consisting of two thin lenses, convergent and identical, of focal length f, the pupil delay is $2\delta$, that is to say $\beta \cdot T \cdot h^2/f$.

Thin lenses (convergent or divergent) are generally produced from a material such as glass or silica. This is why thin lenses are also called refractive lenses. It is for this reason that the pupil delay and the dispersive term of refractive lenses are marked hereinafter by the index r ($\delta_r$ and $\beta_r$).

Thus, for a thin lens made from conventional BK7 glass of index $n_0=1.5068$, we have, at a wavelength of 1053 nm (the period T of a wave at 1053 nm being 3.5 fs), $n_\lambda = -1.33 \times 10^{-5}$ nm$^{-1}$ and $\beta_r = -262$ cm$^{-1}$.

For a thin silica lens of index $n_0=1.45$ used at the same wavelength, we have $n_\lambda = -1.22 \times 10^{-5}$ nm$^{-1}$ and $\beta_r = -271$ cm$^{-1}$.

The components that use the diffraction of a grating for ensuring the convergence or divergence of the light beams are called diffractive lenses. Diffractive lenses are for example produced by etching a given density of lines on the face of a diopter. If this etching is carried out on a face of a plate with flat parallel faces, the pupil delay and the dispersive term of these diffractive lenses are referenced by the index d and are as follows:

$$\delta_d = \beta_d \cdot T \cdot (h^2/2f) \text{ with } \beta_d = 1/\lambda_o$$

We find that the dispersive term $\beta_d$ depends only on the wavelength and that its sign is the reverse of that of a diffractive lens.

If this etching is carried out on one of the faces of a refractive lens then the pupil delay is written as the sum of the pupil delays of the refractive and diffractive parts respectively. We will show subsequently that the refractive contribution is in practice negligible and the pupil delay is written as before.

Researchers have used various solutions for compensating for the pupil delay. These solutions are those normally used for the correction of longitudinal chromatism, that is to say for example the replacement of lenses with chromatic doublets, the insertion of a grating the dispersion of which is the reverse of that of a refractive element, etc.

However, recent work has demonstrated that, for use in a power laser with a high delay to be compensated for (that is to say a few ps), only diffractive solutions are viable. See, N. Blanchot, J, Neauport, C. Rouyer et C. Sauteret, Correction of chromatism in the PETAL Chain, July 2006. Solutions for compensating for pupil delay are therefore still restricted.

The main drawback of current solutions is their static character. This is because, once the delay to be compensated for has been evaluated and the correction system has been sized and installed in the optical system, the correction is fixed. Thus, if there is still a delay to be compensated for, whether it be due to an imperfection in the previous evaluation or the manufacture of the compensating element, or it be due to a modification to the optical scheme of the optical system to be compensated (for example a laser chain), the residual delay can be corrected only by a change in the compensation optical element or elements.

The aim of the invention therefore consists of providing a method for adjusting the pupil compensation of a convergent or divergent beam.

SUMMARY

This aim and yet others are achieved, according to the invention, by virtue of a method of adjusting the pupil delay compensation in a convergent or divergent beam, comprising the steps consisting of:

placing a device composed of an afocal system comprising one or more passive optical components disposed on the propagation axis of said beam, at least one of said components being a focusing diffractive component, moving the device along the propagation axis of the beam until the required pupil delay compensation is obtained, said compensation being the algebraic sum of the pupil delays of each passive optical component of the afocal system and lying in a range of values the limits of which are functions of the particular combination of the optical components chosen to form the afocal system of the compensation device.

According to one embodiment, the afocal system is composed of a set of lenses, at least one of the lenses being diffractive, the afocal system having a magnification of ±1.

Advantageously, the focusing diffractive component is a phase diffractive component or a volume diffractive component.

Advantageously, the focusing diffractive component is chosen from a diffractive lens, a diffractive Fresnel lens, a diffraction grating or the like.

Advantageously, the passive optical components are lenses and are chosen so that:
the system is afocal and has a magnification of ±1, and
at least one of the lenses is diffractive.

Advantageously, the afocal system consists of two lenses having the same absolute focal-length value $f_0$, a convergent lens and a divergent lens, one of the lenses being refractive and the other lens being diffractive.

The device used in the method is a pupil delay compensation device intended to be inserted in the optical path of a convergent or divergent beam in an adjustable position on the propagation axis of said beam so as to adjust the compensation of an axial-symmetry pupil delay of said beam. The device is composed of an afocal system comprising one or more passive optical components disposed on the propagation axis of the beam, at least one of said components being a focussing diffractive component.

"Afocal system" means a system that, illuminated by a beam of parallel rays, delivers another beam of parallel rays.

"Magnification" means the algebraic ratio of the diameter of the output beam of parallel rays to that of the diameter of the input beam of parallel rays.

The compensation devices used during the method according to the invention can be inserted on any type of convergent or divergent beam, in an adjustable position on the propagation axis in order to adjust a perfect compensation of the axial-symmetry pupil delay. The method according to invention can thus be used to adjust a beam in a laser chain.

The method according to the invention affords a simple and original solution for providing an adjustable delay of the wave packet in order to compensate for the delay that arises between the central ray and the peripheral rays during the propagation of a brief pulse in a femtosecond chain containing lenses.

This compensation optimises the confinement of the electromagnetic field on the target. It should be noted that this delay, of axial symmetry, varies as the square of the transverse spatial dimension of the packet and can also be seen as being a longitudinal chromatism. In this description it is called "pupil delay".

The intrinsic pupil delay of the device used in the method according to the invention is equal to the algebraic sum of the delays of the optical components constituting the afocal system of the device. If the afocal system of the device has only one optical component, it will in this case be a zero-power diffractive lens and the pupil delay of the device will be equal to the pupil delay of the diffractive face of the lens, to which there is added the pupil delay of the refractive lens on which the diffractive function is implemented. If the afocal system comprises several optical components, the pupil delay will be the sum of the pupil delays of said optical components, at least one of the components being diffractive.

The advantage of the device used in the method according to the invention is that it makes it possible to correct, in an adjustable fashion, the axial pupil delay and therefore the axial chromatism, of an optical assembly solely by adjusting the position of said device in the assembly. This device can be introduced in any optical installation where the pupil delay constitutes the main drop in performance. It can compensate for any type of delay with excellent precision.

BRIEF DESCRIPTION OF THE DRAWINGS

The invention will be better understood and other advantages and particularities will emerge from a reading of the following description, given by way of non-limitative example, accompanied by the attached drawings, among which.

DETAILED DISCLOSURE OF PARTICULAR EMBODIMENTS

In the case of a compensation device consisting of a convergent diffractive lens $L_d$ of focal length $+f_0$ and a divergent refractive lens $L_r$ of focal length $-f_0$, the intrinsic pupil delay is $\delta_0$ such that:

$$\delta_0 = \beta_d \cdot T \cdot (h^2/2f_0) + \beta_r \cdot T \cdot (h^2/2f_0)$$
$$\cong \beta_d \cdot T \cdot (h^2/2f_0)$$

In this embodiment, we take into account only the intrinsic pupil delay $\delta(x)$ calculated for an aperture $h(x)$ and caused by the diffractive lens $L_d$ of the adjustment device. The ratio $\beta_d/\beta_r$ between the dispersive terms of a diffractive lens and of a refractive lens is around ±35. Thus, for a given opening, when the two types of lens are present, it is possible to ignore the pupil delay of a refractive lens compared with that of a diffractive lens.

The movement of the compensation device in the beam, whether it be convergent or divergent, modifies the height h and therefore the intrinsic pupil delay of the device. The compensating capacity of the device is therefore adjustable. For example, at 1053 nm, for a numerical focal lens aperture $f_0/5$ ($f_0$ is 5 times larger than the diameter 2 h of the laser beam), expressed in fs, is around $+166.f_0$ (where $f_0$ is expressed in cm). Thus, for a focal length $f_0$ of 20 cm, $\delta_0$ is +3.32 ps. The delay is here capable of compensating for a total advance afforded by the refractive lenses in the chain of 3.32 ps.

A few non-limitative examples of optical assemblies in which the adjustment device according to the invention is inserted will now be given.

Figure 1:
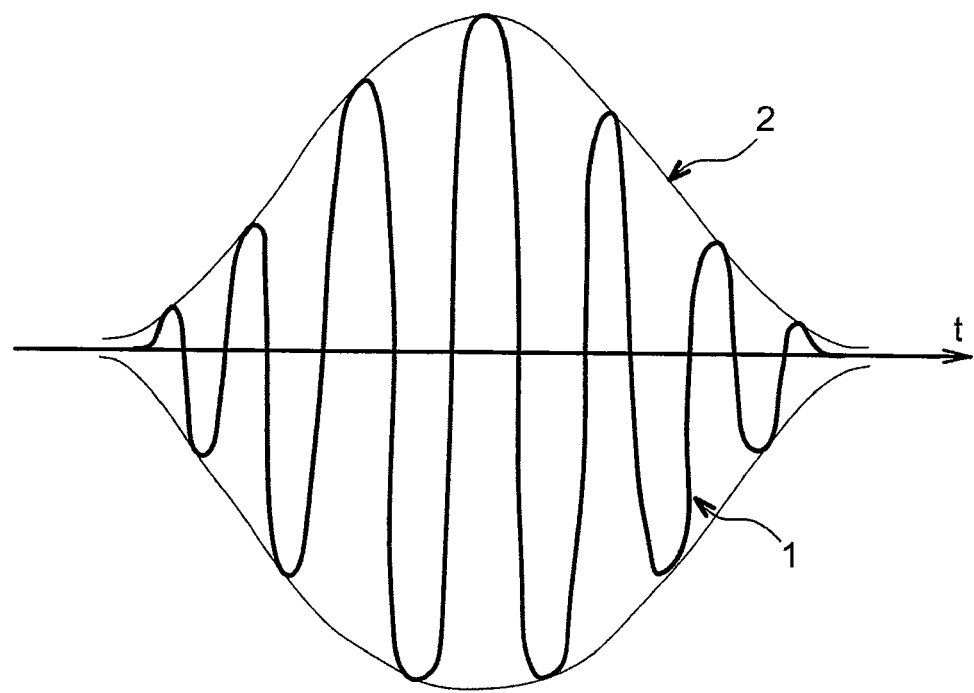
FIG. 1 shows a light pulse.
Figure 2:
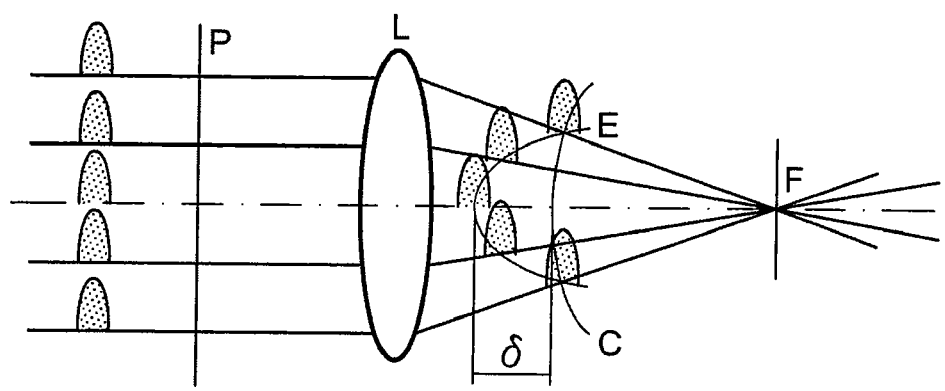
FIG. 2 illustrates the pupil delay suffered by a light pulse after passing through a lens.
Figure 3:
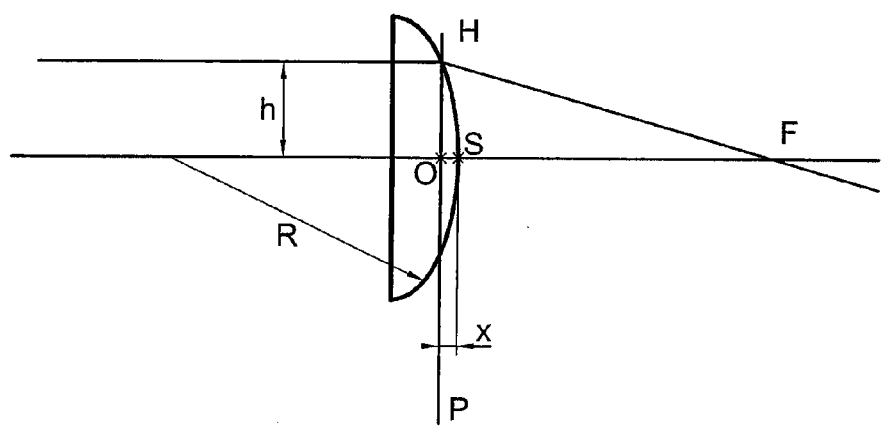
FIG. 3 illustrates the difference in distance travelled by a central beam and by a peripheral beam through a thin plano-convex lens.
Figure 4:
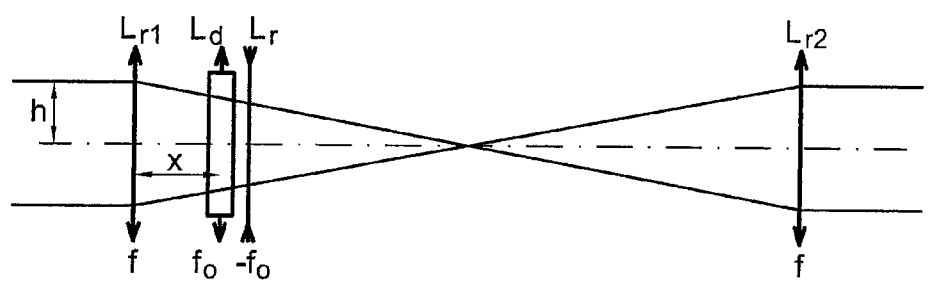
FIG. 4 shows a first assembly including the adjustment device according to the invention.

The first assembly is an afocal system of axial magnification +1 and is shown in FIG. 4. It comprises two convergent and refractive lenses $L_{r1}$ and $L_{r2}$ with the same focal length f and distant by 2f, and a device for adjusting the delay consisting of a diffractive convergent lens $L_d$ and a refractive divergent lens $L_r$. The adjustment device is inserted between the lenses $L_{r1}$ and $L_{r2}$.

The adjustment device is disposed at a distance x from the lens $L_{r1}$. This distance x is the adjustment parameter.

The intrinsic pupil delay of the device is equal to the algebraic sum of the delays of the component or components constituting the afocal system of zero optical power. In this embodiment, only the intrinsic pupil delay $\delta(x)$ calculated for an opening $h(x)$ and caused by the diffractive lens $L_d$ of the subsequent device is taken into account. This is because, as seen previously, it is possible to ignore the pupil delay of a refractive lens, compared with that of a diffractive lens.

$\delta_0 = \beta_d . T . (h^2/2f_0)$ and $\delta(x) = \beta_d . T . (h^2(x)/2f_0)$ with $h(x) = h . [1-(x/f)]$ The calculated delay $\delta(x)$ for position x is then expressed by:

$\delta(x) = \delta_0 . (1-x/f)^2$

The distance x is the adjustment parameter.

The delay able to be corrected by the device according to the invention is framed by two extreme values:

$\delta_0 . (1-x_{max}/f)^2 \leq \Delta(x) \leq \delta_0$

Let us accept that the maximum value of x, denoted $x_{max}$, is f/4 (for reasons of flux). Under these circumstances, $\delta(x)$ varies between:

$(9/16) . \delta_0 \leq \delta(x) \leq \delta_0$

Thus, for a numerical opening of $f_0/5$ and a focal length $f_0$ of 20 cm, $\delta_0$ is 3.32 ps.

Using this device, the maximum compensatable delay is 1.87 ps (x=f/4) and the maximum delay is 3.32 ps (x=0 cm).

The pupil delay compensation is then adjustable over a range, the limits of which are in a ratio close to 2.

Figure 5:
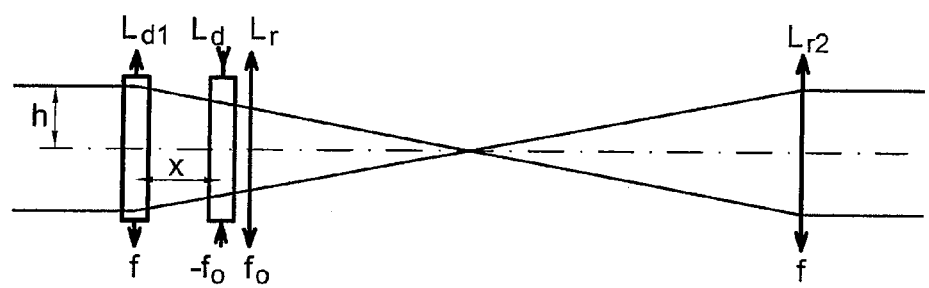
FIG. 5 shows a second assembly including the adjustment device according to the invention.

In order to increase this ratio and/or to be able to place these limits on each side of a zero pupil delay, a second non-limitative representative example of application of the adjustment device according to the invention is presented in FIG. 5.

The adjustable compensation device is here inserted in an afocal system of axial magnification +1.

The afocal system consists of two convergent lenses with the same focal length f and distant by 2f, the first lens $L_{d1}$ being diffractive and the second lens $L_{r2}$ being refractive.

The adjustable compensation device consists here of an association of a diffractive divergent lens $L_d$ of focal length $-f_0$ and a refractive convergent lens $L_r$ of focal length $+f_0$. The intrinsic pupil delay of the compensation system is then:

$$\delta_0 = \beta_d \cdot T \cdot (-h^2/2f_0) + \beta_r \cdot T \cdot (h^2/2f_0)$$
$$\cong -\beta_d \cdot T \cdot (h^2/2f_0)$$

Only the intrinsic pupil delays $\delta_1$ and $\delta_0$ induced by the diffractive lenses $L_{d1}$ and $L_d$, calculated for an aperture h, are taken into account.

$$\delta_0 = -\beta_d \cdot T \cdot (h^2/2f_0) \text{ and}$$

$$\delta_1 = \beta_d \cdot T \cdot (h^2/2f) = -\delta_0 \cdot (f_0/f)$$

The delay calculated for position x is expressed by:

$$\delta(x) = \delta_1 + \delta_0 \cdot (1-x/f)^2$$

The delay $\delta(x)$ afforded by the system is framed by two extreme values:

$$\delta_1 + \delta_0 \leq \delta(x) \leq \delta_1 + \delta_0 \cdot (1-x_{max}/f)^2 \text{ or}$$

$$\delta_0[1-(f_0/f)] \leq \delta(x) \leq \delta_0 \cdot [(1-x_{max}/f)^2 - (f_0/f)]$$

Thus, if there is a value of $f_0$ equal, for example, to 0.95f and a maximum value of x of f/4 (for reasons of flux), then $\delta(x)$ varies between:

$$0.05 \cdot \delta_0 \leq \delta(x) \leq -0.39 \cdot \delta_0$$

For a numerical opening of $f_0/5$ and a focal length $f_0$ of 100 cm, $\delta_0$ is equal to −16.7 ps.

The minimum compensatable delay is then −0.835 ps (for x=0 cm) and the maximum delay is 6.5 ps (for x=25 cm).

$$-0.835 \text{ ps} \leq \delta(x) \leq +6.5 \text{ ps}$$

It will be noted that the pupil delay correction requirements are normally situated between a minimum of 10 to 100 fs up to a maximum of several ps. According to the optical components chosen to constitute the afocal system (for example choice of a phase or amplitude diffractive Fresnel lens comprising a diffractive face, a divergent/convergent and diffractive/refractive lens, a phase or amplitude diffraction grating, etc), it is very easy to adapt the adjustment device to any type of pupil delay or advance, as demonstrated in the above two example embodiments.

The above examples of compensation device comprised an afocal system consisting of two lenses. However, it is also possible to obtain devices comprising a single diffractive component or more than two optical components with at least one of the components being diffractive. It is thus possible to have all kinds of combinations of optical components, for example a single component of zero power comprising a diffractive face and a refractive face, such as a diffractive Fresnel lens, or a combination of three lenses or more.

It should be noted that the optical components constituting the afocal system are passive components, that is to say they do not require any energy for operating.

The diffractive components can be chosen from diffractive Fresnel lenses, holographic gratings, phase gratings, etc. The choice of suitable diffractive component is made by seeking the one that offers a good compromise between the best compensation for the pupil delay and the best energy efficiency.

Curved mirrors or components of parabolic shape can also be used as optical components, in addition to the diffractive optical components.

The adjustment device according to the invention is intended to compensate for the pupil delay in high-energy pulse-type laser installations of the type installed in France (LIL and LMJ of the CEA, PETAL, Pico2000 (version kJ-PW) at the Laboratory for the Use of Intense Lasers of the Ecole Polytechnique) and in the United States (NIF Programme) and in the majority of countries that are interested in materials physics, dense plasma and thermonuclear fusion.

The device according to the invention can equally be used by commercial lasers with short pulses, that is to say less than one picosecond.

It can also meet specific requirements where brief or ultra-brief laser pulses are used with very open lenses, such as in microscopy or ophthalmology and biophysical and medical engineering instrumentation.

In general terms, the device can be used in any electromagnetic wave propagation system (with all spectra merged) that intrinsically has an axial pupil delay and therefore axial chromatism.

The invention claimed is:

1. A method of adjusting the pupil delay compensation of a convergent or divergent beam propagating along a propagation axis, the method comprising:
    providing a device including an afocal system comprising one or more passive optical components disposed along an axis, wherein at least one of the components comprises a focusing diffractive component,
    placing the afocal system on the propagation axis of the beam, the axis of the afocal system being coaxial with the propagation axis of the beam, and
    moving the device along the propagation axis of the beam until a required pupil delay compensation is obtained,
    wherein the delay compensation comprises the algebraic sum of intrinsic pupil delays of each of the one or more passive optical components of the afocal system and is within a range of delay compensation values, where the limits of the range comprise functions of the combination of the one or more passive optical components in the afocal system of the device.

2. The method of adjusting pupil delay compensation according to claim 1, wherein the afocal system comprises a set of lenses, wherein at least one of the lenses is diffractive, the afocal system having a magnification of ±1.

3. The method of adjusting pupil delay compensation according to claim 1, wherein the focusing diffractive component comprises a phase diffractive component or a volume diffractive component.

4. The method of adjusting pupil delay compensation according to claim 3, wherein the focusing diffractive component comprises a diffractive lens, a diffractive Fresnel lens, or a diffraction grating.

5. The method of adjusting pupil delay compensation according to claim 1, wherein the afocal system has a magnification of ±1, the passive optical components comprise lenses and at least one of the lenses comprises a diffractive lens.

6. The method of adjusting pupil delay compensation according to claim 5, wherein the focusing diffractive component comprises two lenses having the same absolute focal-length value $f_0$, a convergent lens and a divergent lens, wherein one of the two lenses comprises a refractive lens and the other of the two lenses comprises a diffractive lens.

7. The method of adjusting pupil delay compensation according to claim 5, wherein the afocal system has a magnification of ±1, the passive optical components are lenses and at least one of the lenses is a diffractive lens.

* * * * *